(12) United States Patent
Daun et al.

(10) Patent No.: US 11,418,478 B2
(45) Date of Patent: Aug. 16, 2022

(54) SYSTEMS AND METHODS FOR IMPROVING ARP/ND PERFORMANCE ON HOST COMMUNICATION DEVICES

(71) Applicant: ARRIS Enterprises LLC, Suwanee, GA (US)

(72) Inventors: Carl L. Daun, Oak Park, IL (US);
James J. Bryla, Bridgeview, IL (US);
Jeffrey R. Shroda, Boiling Brook, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/227,425

(22) Filed: Dec. 20, 2018

(65) Prior Publication Data

US 2020/0204517 A1  Jun. 25, 2020

(51) Int. Cl.
| | | |
|---|---|---|
| *H04L 61/103* | (2022.01) | |
| *H04L 61/5014* | (2022.01) | |
| *H04L 12/28* | (2006.01) | |
| *H04L 67/51* | (2022.01) | |
| *H04L 101/622* | (2022.01) | |

(52) U.S. Cl.
CPC ........ *H04L 61/103* (2013.01); *H04L 12/2801* (2013.01); *H04L 61/2015* (2013.01); *H04L 61/6022* (2013.01); *H04L 67/16* (2013.01)

(58) Field of Classification Search
CPC ............... H04L 61/103; H04L 61/2015; H04L 12/2801; H04L 67/16; H04L 61/6022
See application file for complete search history.

(56) References Cited

U.S. PATENT DOCUMENTS

| | | | | |
|---|---|---|---|---|
| 6,594,305 B1 * | 7/2003 | Roeck | ..................... | H04L 12/66 348/E7.07 |
| 7,234,163 B1 * | 6/2007 | Rayes | ..................... | H04L 61/10 726/25 |
| 9,055,000 B1 * | 6/2015 | Ghosh | ..................... | H04L 45/74 |
| 9,590,824 B1 * | 3/2017 | Sikand | ................ | H04L 12/4666 |
| 2003/0055929 A1 * | 3/2003 | Ding | ........................ | H04L 41/00 709/201 |
| 2003/0185233 A1 * | 10/2003 | Ji | ............................ | H04W 8/26 370/466 |
| 2007/0121617 A1 * | 5/2007 | Kanekar | .................. | H04L 45/22 370/389 |
| 2008/0219162 A1 * | 9/2008 | Akyol | ..................... | H04L 47/70 370/232 |
| 2012/0017251 A1 * | 1/2012 | Zhang | ................. | H04N 21/4432 725/109 |

(Continued)

OTHER PUBLICATIONS

D. Plummer (Nov. 1982), "RFC 826, An Ethernet Address Resolution Protocol- or -Converting Network Protocol Addresses to 48.bit Ethernet Address for Transmission on Ethernet Hardware". Internet Engineering Task Force, Network Working Group.

(Continued)

*Primary Examiner* — Ninos Donabed
(74) *Attorney, Agent, or Firm* — Chernoff, Vilhauer, McClung & Stenzel, LLP

(57) ABSTRACT

Systems and methods for periodically refreshing the MAC-IP bindings in the database based on message exchanges made with the plurality of second network devices under a secondary protocol different than the at least one of an ARP protocol and an ND protocol.

3 Claims, 3 Drawing Sheets

(56) References Cited

U.S. PATENT DOCUMENTS

| | | | | |
|---|---|---|---|---|
| 2014/0003426 A1* | 1/2014 | Sankar | ............... | H04L 61/103 |
| | | | | 370/390 |
| 2014/0064104 A1* | 3/2014 | Nataraja | ............ | H04L 61/103 |
| | | | | 370/254 |
| 2014/0376556 A1* | 12/2014 | Haggar | .............. | H04L 61/103 |
| | | | | 370/400 |
| 2015/0256445 A1* | 9/2015 | Pai | ...................... | H04L 45/66 |
| | | | | 709/238 |
| 2015/0271086 A1* | 9/2015 | Hellhake | ........ | H04W 28/0289 |
| | | | | 370/235 |
| 2017/0026245 A1* | 1/2017 | Rao | ...................... | H04L 45/02 |
| 2017/0026246 A1* | 1/2017 | Rao | ...................... | H04L 41/12 |
| 2017/0317919 A1* | 11/2017 | Fernando | ........... | H04L 41/0806 |
| 2017/0373973 A1* | 12/2017 | Bickhart | ............. | H04L 45/50 |
| 2018/0006969 A1* | 1/2018 | Venkateshaiah | ....... | H04L 45/02 |
| 2018/0020000 A1* | 1/2018 | Rzezak | ........... | H04N 21/25816 |
| 2018/0077047 A1* | 3/2018 | Srinivasan | ............ | H04L 45/48 |

OTHER PUBLICATIONS

T. Narten, et al. (Sep. 2007) "RFC 4861, Neighbor Discovery for IP version 6 (IPv6)". Internet Engineering Task Force, Network Working Group.

\* cited by examiner

SYSTEMS AND METHODS FOR IMPROVING ARP/ND PERFORMANCE ON HOST COMMUNICATION DEVICES

CROSS REFERENCE TO RELATED APPLICATIONS

None.

BACKGROUND

The subject matter of this application relates to systems and methods that update the association of a media access control (MAC) address of a cable modem in a communications network with an Internet Protocol (IP) address of that cable modem.

What is colloquially referred to as the "Internet" is a large number of interconnected networks, each separately operated by a different Internet Service Provider (ISP). To enable the transfer of data among and within these different individual networks, each device connected to the larger Internet is given a unique IP address which identifies that connection's location. Thus, the purpose of the IP address is to identify the location in a network by which a device transmits data into the Internet and receives data from the Internet. Every ISP has a pool of IP addresses that they manage, and when a customer connects to their network with a modem, which is the connection point to the Internet from that customer, the modem is assigned an IP address.

A MAC address, conversely, uniquely identifies a network device itself, regardless of the location or network to which it is connected. Thus, while IP addresses are assigned by ISPs and can be re-assigned as devices connect and disconnect, MAC addresses are tied to a physical network adapter and are assigned by manufacturers using a 12-bit hexadecimal identifier which provides over 281 trillion different combinations.

Since a MAC address uniquely identifies a network device, transfer of data to and from different devices connected through the Internet requires both the IP address (which identifies the network connection to the Internet) as well as the MAC address of the devices sending and receiving the data. For example, a home network may be connected to the Internet using an IP address assigned to a cable modem, but may also include several computers, printers, etc. that exchange data over the Internet. Thus, each MAC address of the individual devices in the network (including the modem) may all be associated with the IP address of the modem so that packets of data can be addressed to the destination device they are intended for.

Moreover, IP addresses are often assigned dynamically, meaning that when a device such as a cable modem or other gateway to a network connects to a network, it contacts a server, called a Dynamic Host Configuration Protocol (DHCP) server, which dynamically assigns an IP address to identify the connection of that device to the Internet. That address typically is assigned to the connected device until it disconnects; when it reconnects, it will be assigned a different IP address.

For each of these reasons, providers of network content not only need to discover and associate MAC addresses of various devices with the IP address ultimately used to connect those devices to the Internet, but also need to periodically update those associations since the IP addresses used to connect those devices to the Internet can change.

Two different protocols have been established to obtain, store, and confirm the continued validity of, the association of an IP address with a MAC address (called "MAC-IP bindings") for individual devices—Address Resolution Protocol (ARP) with respect to IPv4 and Network Discovery (ND) with respect to IPv6. With respect to each of these protocols, when any device wishes to send data to another target device, it must first determine the MAC address of that target given its IP address. These IP-to-MAC address mappings (bindings) are retrieved from an ARP/ND database or cache maintained on each device. If the given IP address does not appear in a device's cache, that device cannot direct messages to that target until it obtains a new mapping. To do this, the initiating device first sends a request broadcast message. The device with the given IP address responds with a reply in response to the broadcast, allowing the initiating device to update its cache and proceed to deliver messages directly to the target.

As noted earlier, because these bindings may change as connected devices are dynamically assigned different IP addresses, both the ARP and ND protocols require that the bindings be refreshed at periodic intervals to ensure that the bindings listed in a device's database or cache are current. However, on large network systems, where a host communication device is servicing a large number of connected clients, the sum of all of these refresh messages may result in significant resource depletion on the host device in terms of processor capacity and message transaction rate capability.

What is desired, therefore, is an improved system for collecting and updating MAC-IP bindings in a networked environment.

SUMMARY OF THE DISCLOSURE

A first embodiment of the disclosure may comprise a system having a first network device connected to a plurality of second network devices, a database, and a handling system. Each second network device may have a MAC address and a dynamically generated IP address, and the database stores MAC-IP bindings for each of the second network devices. The handling system initially populates the database with a MAC-IP binding for each of the plurality of second network devices based on a communication between a respective said one of the plurality of second network devices and a DHCP server, and according to at least one of an ARP protocol and an ND protocol. The MAC-IP bindings in the database are periodically refreshed based on message exchanges made with the plurality of second network devices under a secondary protocol different than the at least one of an ARP protocol and an ND protocol.

A second embodiment of the disclosure may comprise a method that initially populates a database with a MAC-IP binding for each of a plurality of second network devices based on a communication between a respective one of a plurality of second network devices and a DHCP server, and according to at least one of an ARP protocol and an ND protocol. The MAC-IP bindings in the database may be periodically refreshed based on message exchanges made with the plurality of second network devices under a secondary protocol different than the at least one of an ARP protocol and an ND protocol.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
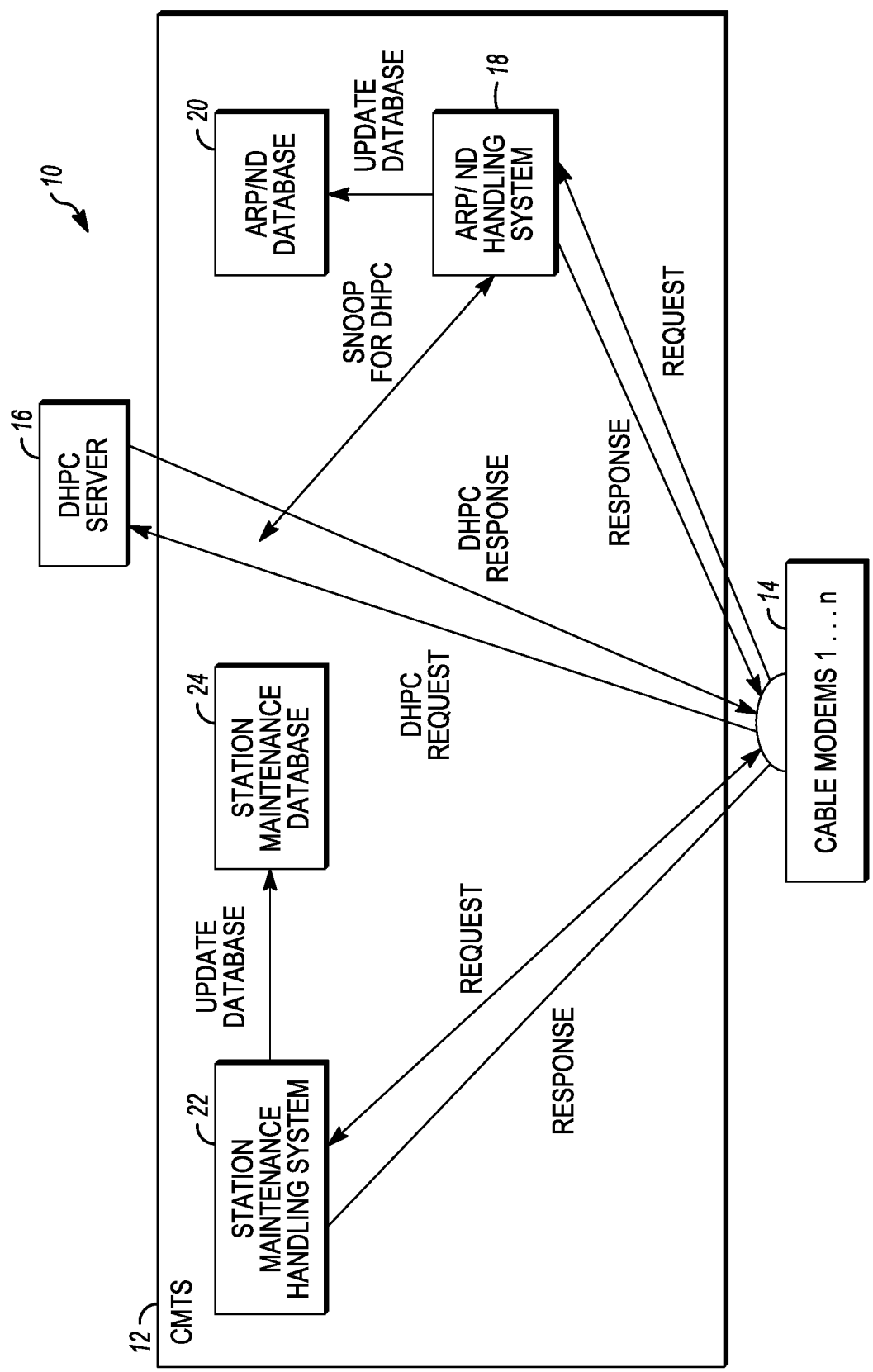
FIG. 1 shows a system for discovering and updating MAC IP bindings in a network environment comprising a Cable Modem Termination Service (CMTS) connected to a plurality of cable modems.

As previously noted, the periodic refresh messages required by the ARP and ND protocols—which ensure that the MAC-IP bindings used by devices to communicate and transfer data are current—may be burdensome on large network systems, where a host communication device is servicing a large number of connected clients. FIG. 1 illustrates this phenomenon using a system 10 having a Cable Modem Termination Service (CMTS) 12 which provides service to a large number of cable modems 14. Those of ordinary skill in the art will appreciate, however, that the problems illustrated by the system 10 of FIG. 1, and the improvements to that system later described, are exemplary of many other systems and architectures.

When a cable modem 14 first connects to the Internet, it contacts DHCP server 16 with a message providing the DHCP server 16 with its MAC address and requesting assignment of an IP address. The DHCP server 16 responds accordingly with an IP address. The CMTS 12 includes an ARP or ND Handling system 18 that snoops on these messages to discover both the MAC address of the requesting cable modem and the IP address assigned to it by the DHPC server 16, and updates its ARP/ND database 20 with the discovered information.

Subsequently, since the ARP/ND Handling system 18 now has the MAC-IP binding associated with the cable modem, the ARP/ND Handling system 18 communicates directly with the cable modem 14 by sending it a refresh message at periodic intervals, and if the cable modem responds to the message, the ARP/ND Handling system 18 refreshes the MAC-IP binding for that modem until the next refresh message is to be sent.

As can easily be appreciated however, since the number of cable modems 14 can be quite high, the periodic refresh messages can quickly become a burden on the processing capability of the CMTS 12. This is particularly true because the CMTS 12 also includes a Station Maintenance Handling System 22 that must regularly communicate with the cable modems 14 to send and receive station maintenance messages, which typically consists of a Range Request sent from a cable modem 14 and a Range Response sent by the CMTS 12. The CMTS 12 analyses the signal quality of the Range Request message, sends back any necessary RF adjustments in the Range Response message, and stores the relevant parameters/adjustments in a station maintenance database 24. This "handshake" between every cable modem 14 and the CMTS 12 must occur once every 30 seconds as dictated by the DOCSIS specification. Accordingly, the refresh messages sent to the cable modems 14 by the ARP/ND Handling System 18 may become so numerous that the functioning of the Station Maintenance Handling System 22 is impaired.

The present inventors realized that, since the only purpose of the refresh messages is to ensure that the stored MAC-IP binding is still current, the message exchanges with a cable modem from the Station Maintenance Handling System could supplant the refresh messages exchanged between the cable modem and the ARP/ND Handling System.

Figure 2:
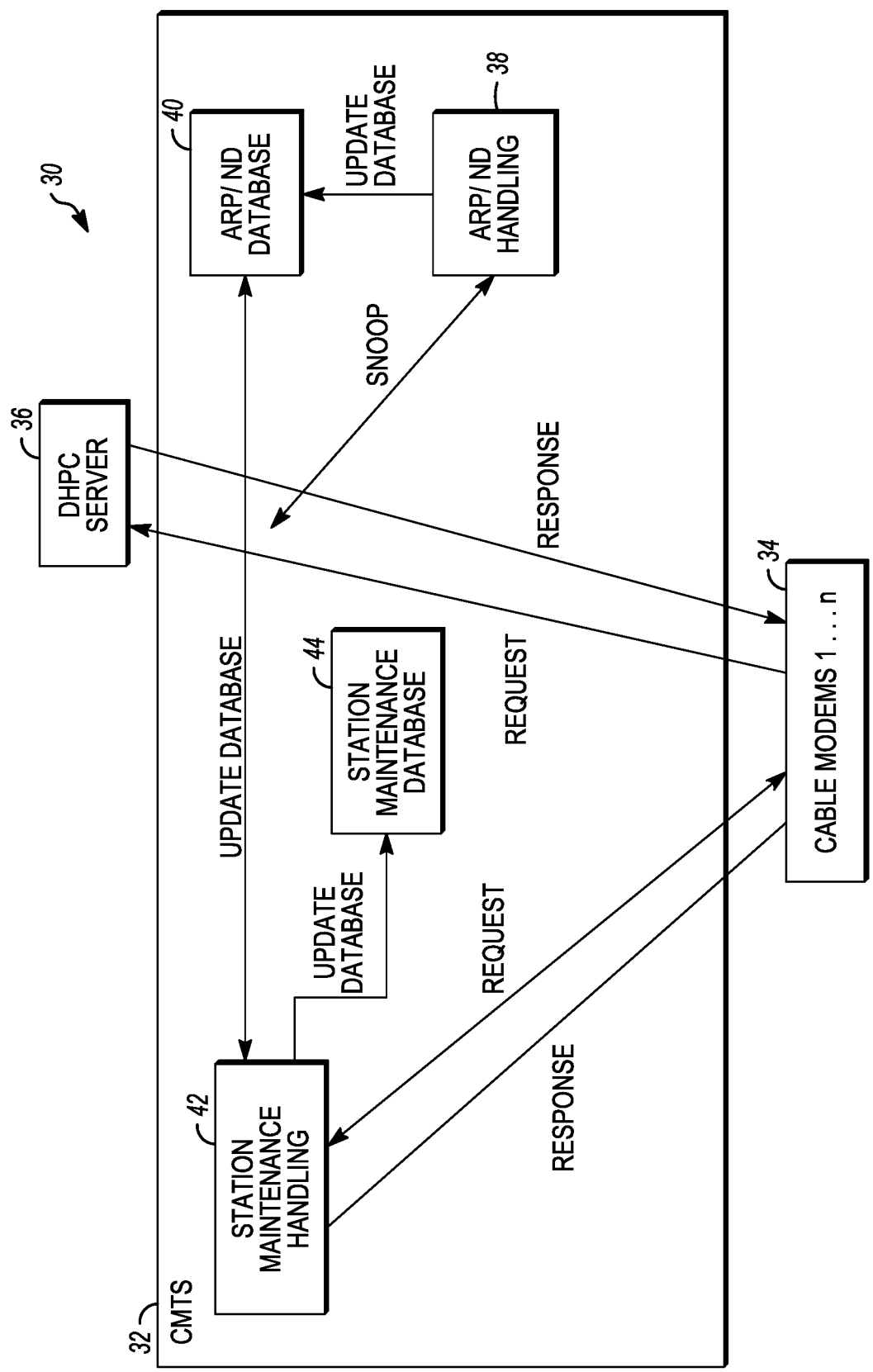
FIG. 2 shows an improved architecture for the system of FIG. 1.

Referring to FIG. 2, for example, an improved system 30 comprises a CMTS 32 in communication with a plurality of cable modems 34. When a cable modem 34 first connects to the Internet it contacts DHCP server 36 with a message providing the DHCP server 36 with its MAC address and requesting assignment of an IP address. The DHCP 36 responds accordingly with an IP address. The CMTS 32 includes an ARP or ND Handling system 38 that snoops on these messages to discover both the MAC address of the requesting cable modem and the IP address assigned to it by the DHCP server 36, and updates its ARP/ND database 40 with the discovered information.

The Station Maintenance System 42 periodically performs station maintenance message exchanges with each cable modem 34 and upon receipt of a response message from a cable modem 34 updates the Station Maintenance Database 44 as well as refreshes the MAC-IP bindings in the ARP/ND database by resetting a timer for the next message exchange. Conversely, if the Station Maintenance System 42 does not receive a maintenance message from a cable modem when scheduled, the Station Maintenance System 42 may update the ARP/ND database by removing the MAC-IP binding for that device. In one preferred embodiment, a MAC-IP binding is removed from the ARP/ND database for a device when that device misses a threshold number of scheduled maintenance message exchanges, the threshold set to a number intended to ensure that the cable modem is no longer online. In other preferred embodiments, a MAC-IP binding is removed from the ARP/ND database for a device when that device fails to provide scheduled maintenance messages for a predefined period of time, i.e. before a timer expires where the timer is reset once a message is received.

As noted earlier, those of ordinary skill in the art will appreciate that, although a CMTS/cable modem system was used in FIG. 2 for illustrative purposes, the technique shown is equally useful in any network system where an ancillary communication protocol, in addition to the ARP/ND protocol, periodically exchanges messages between network devices using MAC-IP bindings store in the ARP/ND database, and at a rate at least as fast as a rate that refresh messages would be sent using the ARP/ND protocol.

Figure 3:
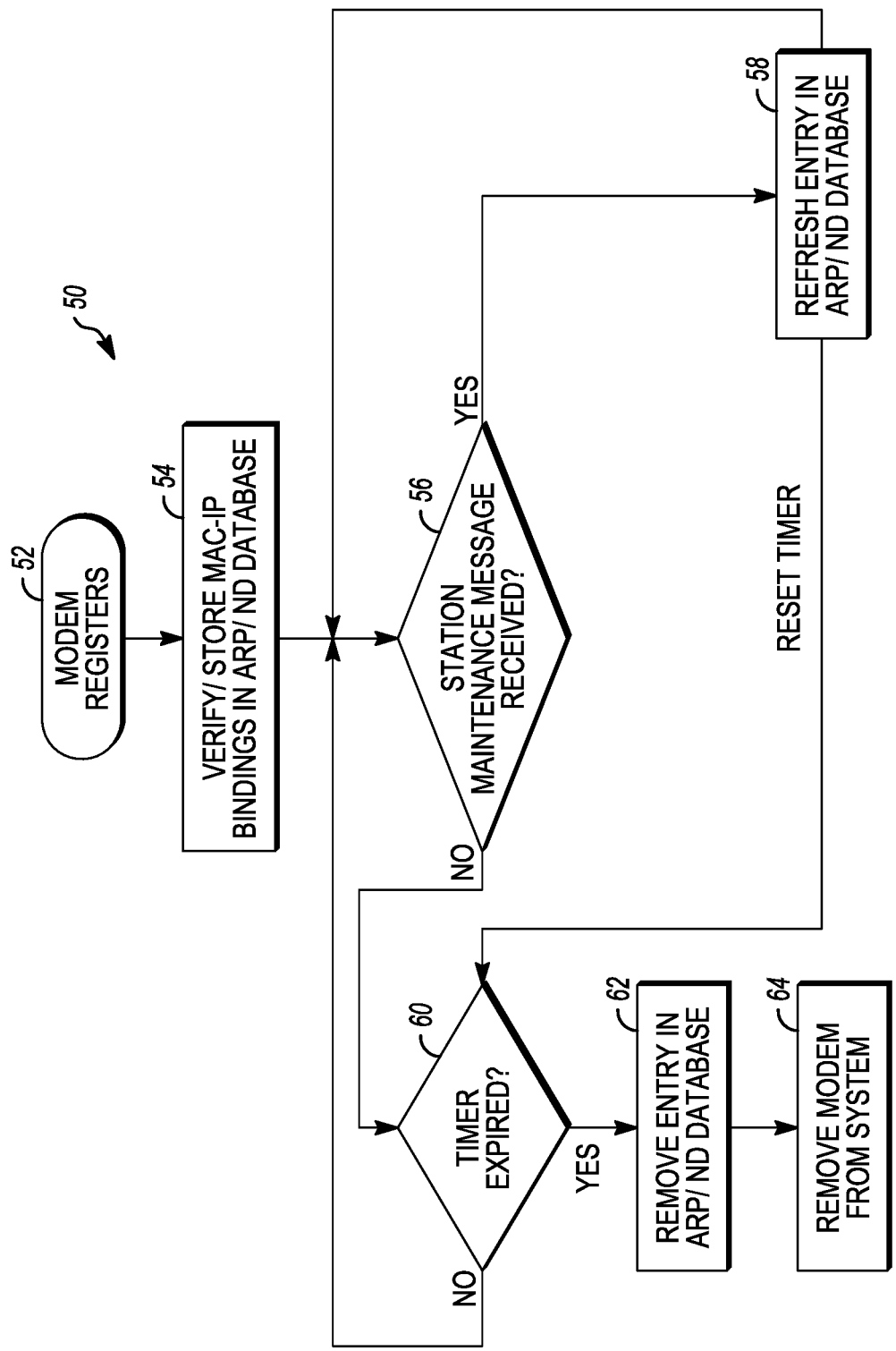
FIG. 3 shows an exemplary method used by the system of FIG. 2.

FIG. 3 shows an exemplary method used by the system of FIG. 2. At step 52 a modem registers with a DHCP server. At step 54, the system verifies and stores a MAC-IP binding for the modem in an ARP or ND database. At step 56, a decision step determines whether a station maintenance message has been received from a modem. If the answer is yes, then at step 58 the MAC-IP binding for that modem is refreshed in the ARP/ND database by resetting a timer for receipt of a maintenance message by the modem. If the answer is no, then a decision step 60 determines whether the timer has expired. The timer may be implemented in any number of ways. For example, the timer could simply increment a counter to determine a number of sequential messages are missed until a threshold number is reached. Alternatively, the timer could be a clock. Regardless of implementation, the timer may be reset at step 58 to effectuate the refresh of a modem's MAC-IP binding, and as long as the timer has not expired, the procedure returns to wait for the next scheduled maintenance message from the modem. If the timer expires at step 60, however, the procedure proceeds to step 62 where the MAC-IP binding is removed from the ARP/ND database and at step 64 the modem is removed from the station maintenance handling system. Once removed from the system, the modem will only reconnect after obtaining another IP address from a DHCP server, at which point the entire procedure will begin again with respect to that modem.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A system comprising:
a first network device connected to a plurality of cable modems, each having a Media Access Control (MAC) address and a dynamically generated Internet Protocol (IP) address;
the first network device operatively connected to and using a database for storing MAC-IP bindings for each of the cable modems; and
the first network device including a handling system that initially populates the database with a MAC-IP binding for each of the plurality of cable modems based on a communication between a respective said one of the plurality of cable modems and a Dynamic Host Control Protocol (DHCP) server, and according to at least one of an Address Resolution Protocol (ARP protocol) protocol and a Neighbor Discovery (ND) protocol;
wherein the IP addresses of the MAC-IP bindings in the database are selectively and periodically refreshed by the first network device based on station maintenance message exchanges made between a Cable Modem Termination Service (CMTS) and the plurality of cable modems, selection based on message exchanges made with the plurality of cable modems under a secondary protocol independent of the ARP protocol and independent of the ND protocol;
wherein at least one message between the handling system and each of the plurality of second network devices is removed after initially populating the database with the MAC-IP binding for the respective second network device; and
wherein the MAC-IP bindings in the database for a second network device are selectively removed after the second network device misses a threshold number of message exchanges under the secondary protocol.

2. A method comprising:
initially populating, by a handling system of a first network device, a database with a MAC-IP binding for each of a plurality of cable modems connected to the first network device based on a communication between a respective said one of the plurality of cable modems and a DHCP server, and according to at least one of an ARP protocol and an ND protocol;
selectively refreshing, by the first network device, the IP addresses of each of the MAC-IP bindings in the database based on station maintenance message exchanges made between a Cable Modem Termination Service (CMTS) and the plurality of cable modems, selection based on periodic message exchanges made with the plurality of cable modems under a secondary protocol independent of the ARP protocol and independent of the ND protocol;
after initially populating the database with the MAC-IP binding for the respective second network device, selectively removing at least one message between the handling system and each of the plurality of second network devices; wherein
the MAC-IP bindings in the database for a second network device are selectively removed after the second network device misses a threshold number of message exchanges under the secondary protocol.

3. A non-transitory computer-readable medium containing stored program instructions, which, when executed by one or more processors of a computer system, cause the one or more processors to perform steps of the method of claim 2.

* * * * *